United States Patent
Choy et al.

(10) Patent No.: US 7,572,326 B2
(45) Date of Patent: *Aug. 11, 2009

(54) FIXER FLUID AND INKJET INK SETS INCLUDING THE SAME

(75) Inventors: Mark L. Choy, San Diego, CA (US); Gary W. Byers, San Diego, CA (US); Yi-Hua Tsao, San Diego, CA (US); George Sarkisian, San Diego, CA (US); Keshava A. Prasad, San Diego, CA (US); Christian Schmid, San Diego, CA (US); Ervin Mubarekyan, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/736,772

(22) Filed: Apr. 18, 2007

(65) Prior Publication Data

US 2008/0257203 A1  Oct. 23, 2008

(51) Int. Cl.
*C09D 11/02* (2006.01)
(52) U.S. Cl. .............. 106/31.43; 106/31.47; 106/31.49; 106/31.58; 106/31.75; 106/31.77; 106/31.78; 106/31.86
(58) Field of Classification Search ............... 106/31.43, 106/31.47, 31.49, 31.58, 31.75, 31.77, 31.78, 106/31.86
See application file for complete search history.

(56) References Cited

U.S. PATENT DOCUMENTS

| | | | |
|---|---|---|---|
| 6,261,350 B1 | 7/2001 | Kabalnov | |
| 6,451,098 B1* | 9/2002 | Lye et al. | 106/31.47 |
| 6,699,319 B2 | 3/2004 | Adams et al. | |
| 6,740,689 B1* | 5/2004 | Lee et al. | 523/160 |
| 6,767,090 B2 | 7/2004 | Yatake et al. | |
| 6,866,707 B2 | 3/2005 | Kato | |
| 6,869,470 B2 | 3/2005 | Kato | |
| 6,908,185 B2 | 6/2005 | Chen et al. | |
| 6,953,613 B2 | 10/2005 | Reem et al. | |
| 7,030,174 B2 | 4/2006 | Yatake | |
| 7,122,077 B2 | 10/2006 | Bauer et al. | |
| 7,129,284 B2 | 10/2006 | Ma et al. | |
| 2003/0087988 A1 | 5/2003 | Nakano et al. | |
| 2003/0101903 A1* | 6/2003 | Lye et al. | 106/31.47 |
| 2004/0017406 A1 | 1/2004 | Kato et al. | |
| 2004/0063808 A1 | 4/2004 | Ma et al. | |
| 2004/0201658 A1 | 10/2004 | Jackson et al. | |
| 2006/0023044 A1 | 2/2006 | Bauer | |
| 2006/0065155 A1* | 3/2006 | Byers et al. | 106/31.43 |
| 2006/0071992 A1* | 4/2006 | Sarkisian et al. | 347/100 |
| 2006/0170746 A1 | 8/2006 | Jackson | |
| 2006/0233975 A1* | 10/2006 | Tran et al. | 428/32.3 |
| 2007/0100022 A1* | 5/2007 | Mubarekyan et al. | 523/160 |
| 2007/0229636 A1* | 10/2007 | Mubarekyan et al. | 347/100 |

OTHER PUBLICATIONS

Dantocol DHE paper from Lonza, 2 pages; no date available.*

* cited by examiner

*Primary Examiner*—Helene Klemanski

(57) ABSTRACT

A fixer fluid for an inkjet ink set includes an aqueous vehicle, and a tri-alkyl-substituted amine-N-oxide. The fixer fluid also includes an acid, a cationic polyelectrolyte, or combinations of the acid and polyelectrolyte(s).

24 Claims, 1 Drawing Sheet

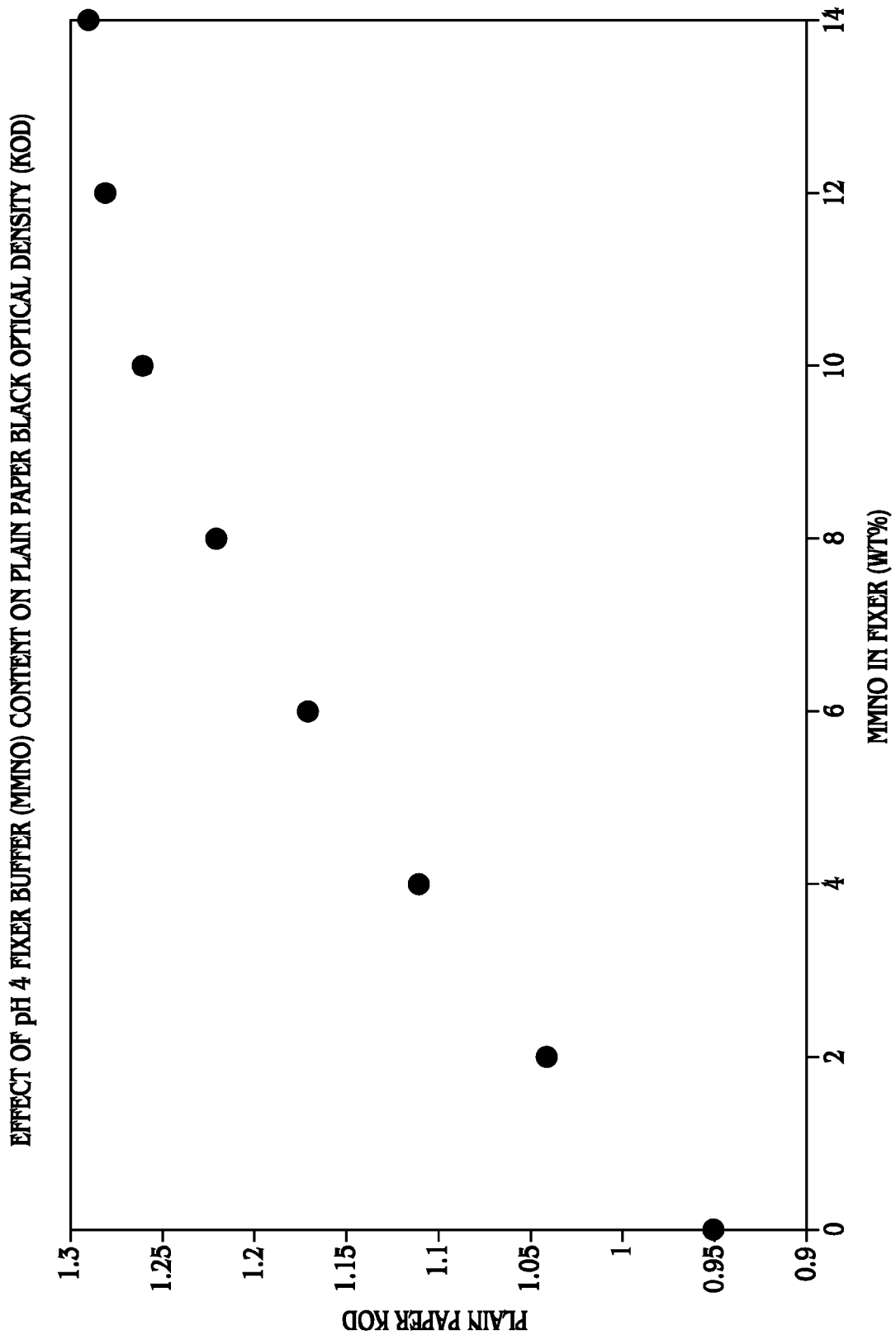

FIXER FLUID AND INKJET INK SETS INCLUDING THE SAME

BACKGROUND

The present disclosure relates generally to a fixer fluid and to inkjet ink sets including the same.

Inkjet printing is a non-impact printing method where droplets of ink are deposited on a print media, such as paper, to form a desired image. Sets of inkjet inks are used in color inkjet printing systems. The ink set often includes a plurality of different colored inks, commonly in groups of four, six or eight colors (e.g., one or more shades of cyan, magenta, yellow and/or black), and may further include an image fixing/fixer fluid. The fixer fluid is generally applied before or after an ink is established on the print media surface. The fixer fluid is a substantially colorless liquid that interacts with the colorant and/or polymeric components of the ink(s) to thereby precipitate or otherwise fix the ink(s) to the print media surface. Although several suitable ink sets including a fixer fluid are currently available, improvements thereto are desirable to formulate more durable and reliable inks that will produce higher quality print images on the print media surface.

BRIEF DESCRIPTION OF THE DRAWING

Features and advantages of embodiments of the present disclosure will become apparent by reference to the following detailed description and drawing.

FIG. 1 is a graph depicting the effect of buffer (4-methylmorpholine-N-oxide) content in an embodiment of the fixer disclosed herein on plain paper optical density for black ink.

DETAILED DESCRIPTION

Embodiment(s) of the inkjet ink set including the fixer fluid disclosed herein advantageously produces relatively high quality print images when deposited on a print media surface. The fixer fluid is formulated to accommodate pigment-based inks, dye-based inks, pigment- and dye-based inks; and improvements to performance, reliability and durability of such inks may be achieved without adding additional components to the ink formulation(s). For example, desirable levels of ink reliability (decap, kogation, etc.) and improved image durability may be achieved without the ink formulation(s) including relatively high amounts of polymers or binders, which may deleteriously impact pen reliability. The combination of the fixer fluid and the inks disclosed herein advantageously produces images having enhanced optical density, hi-liter performance, cellulose paper curl performance, and color gamut, without deleteriously affecting waterfastness and edge acuity.

As used herein, the singular forms of the articles "a," "an," and "the" include plural references unless the content clearly dictates otherwise.

An image fixing fluid or fixer for an inkjet ink set includes an aqueous vehicle and a tri-alkyl-substituted amine-N-oxide. One embodiment of the fixer fluid also includes an acid. Another embodiment of the fixer fluid also includes one or more cationic polyelectrolytes. Still another embodiment of the fixer fluid also includes combinations of the acid and the cationic polyelectrolyte(s).

As defined herein, the term "fixing fluid" or "fixer" refers to the combination of one or more fixing agents and a vehicle, wherein the fixing agent(s) chemically, electrically, or otherwise physically fix the colorant (e.g., pigment, dye, and/or combinations thereof) of an ink to a print media surface.

Without being bound by any theory, it is believed that the combination of the tri-alkyl-substituted amine-N-oxide and the acid of one embodiment of the fixer protonates a fraction of the tri-alkyl-substituted amine-N-oxide ($R_3N^+$—$O^-$) to form a mixture of the conjugate acid ($R_3N^+$—OH) and tri-alkyl-substituted amine-N-oxide (in effect a low pH buffer) which interacts with the pH sensitive colorant of a pigmented ink to precipitate the pigment and to fix the ink to the print media surface.

It is also believed that the cationic polyelectrolyte(s) of another embodiment of the fixer interact with anionic colorant(s) of dye-based or pigment and dye-based ink(s) to fix the ink to the print media surface.

Pigment colorant dispersions, which may be stabilized by weak acid anions (e.g., carboxylate functionalities), are sensitive to pH (i.e., pigment particles lose charge and the normal coulombic (negative) charge repulsion between particles becomes ineffective in an acidic environment). It is believed that this is why acid fixers effectively interact with pigmented inks that employ carboxylate based dispersing aids. Dyes, in contrast to pigments, are often solubilized by sulfonate functionalities, which are not sensitive to easily accessible pH changes. Dyes may be effectively insolubilized by binding to polycations. It is believed that this is why cationic polyelectrolyte containing fixers effectively interact with sulfonated dye-based inks. As such, it is further believed that a fixer having both an acid conjugate and a polycation will be effective for an ink containing pigment, dye, or both pigment and dye-based colorants.

As previously described, any of the embodiments of the fixer disclosed herein include the tri-alkyl-substituted amine-N-oxide and the aqueous vehicle. In embodiments of the fixer, the acid in combination with the tri-alkyl-substituted amine-N-oxide acts as a buffer. The amine-N-oxide component of the fixer is a tri-alkyl-substituted (i.e., saturated quaternary) amine-N-oxide. Non-limiting examples of suitable tri-alkyl-substituted amine-N-oxides include ring structures, such as 4-methylmorpholine-N-oxide and 4-ethylmorpholine-N-oxide, or trialkyl structures, such as N,N-dimethyl-N-butylamine-N-oxide and N,N,N-trimethylamine-N-oxide, and/or combinations thereof. Generally, the amine-N-oxides suitable for use in the fixer include three carbon atoms attached to the nitrogen atom. As such, pyridine-N-oxide, unsaturated amine-N-oxides, and other like amine oxides are generally not suitable for the fixer. In an embodiment, the tri-alkyl-substituted amine-N-oxide is present in the fixer in an amount ranging from about 7 wt % to about 45 wt %.

The term "aqueous vehicle," as defined herein, refers to the aqueous mix in which the fixing agent(s) is/are placed to form the fixing fluid. Examples of suitable aqueous vehicle components include, but are not limited to, water, co-solvents, surfactants, additives (corrosion inhibitors, salts, etc.), and/or combinations thereof.

In an embodiment, the aqueous vehicle for embodiments of the fixer includes a water soluble organic co-solvent, a surfactant, and water. Non-limiting examples of the water soluble organic co-solvent include 2-ethyl-2-hydroxymethyl-1,3-propanediol, glycerol propoxylate, tripropylene glycol, 1-(2-hydroxyethyl)-2-pyrrolidinone, 1-(2-hydroxyethyl)-2-imidazolidinone, and/or combinations thereof. The previously listed solvents are suitable for any embodiment of the fixer disclosed herein, particularly when using embodiments of the fixer including amine-N-oxide and cationic polyelectrolytes. Other suitable solvents for embodiments of the fixer including at least the amine-N-oxide and the acid include ethylene glycol, diethylene glycol, triethylene glycol, 1-propoxy-2-propanol (commercially available as Dowanol® PNP from The Dow Chemical Co., Midland, Mich.), and combinations thereof. In an embodiment, the organic co-solvent is present in the fixing fluid in an amount up to about 25 wt %. In a non-limiting example, the organic co-solvent ranges from about 5 wt % to about 20 wt %. The amount of non-amine-N-oxide solvent used in the fixer depends, at least in part, on the viscosity of the solvent and the desired viscosity of the fixer.

Surfactants may also be included in the fixer composition, for example, to assist in controlling the physical properties of the fluid, such as wetting and penetration of the media. Non-limiting examples of suitable surfactant(s) are generally non-ionic or cationic. Several commercially available nonionic surfactants may be used in the formulation of the fixing fluid, examples of which include ethoxylated alcohols such as those from the Tergitol® series (e.g., Tergitol® 15S5, Tergitol® 15S7), manufactured by Union Carbide, Houston, Tex.; surfactants from the Surfynol® series (e.g. Surfynol® 440 and Surfynol® 465), manufactured by Air Products and Chemicals, Inc., Allentown, Pa.; fluorinated surfactants, such as those from the Zonyl® family (e.g., Zonyl® FSO and Zonyl® FSN surfactants), manufactured by E.I. duPont de Nemours and Company, Wilmington, Del.; fluorinated PolyFox® non-ionic surfactants (e.g., PG-154 nonionic surfactants), manufactured by Omnova, Fairlawn, Ohio; or combinations thereof.

In a non-limitative example, the fixer includes fluorinated surfactants (such as, for example, Zonyl® FSO or Zonyl® FSN). It is believed that such surfactants contribute to achieving enhanced image quality (e.g., area fill, uniformity, and the like) and enhanced decap performance.

Suitable cationic surfactants that may be used in the fixing fluid include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

In an embodiment, the surfactant is present in the fixing fluid in an amount up to about 1.5 wt %. As a non-limiting example, the surfactant is present in an amount up to about 1 wt %. In still another non-limiting example, the surfactant is present in an amount ranging from about 0.2 wt % to about 0.6 wt %. The amount of surfactant depends, at least in part, on the type of the surfactant used.

One or more additives may also be incorporated into any of the embodiments of the fixer composition. As used herein, the term "additive" refers to a constituent of the fluid that operates to enhance performance, environmental effects, aesthetic effects, or other similar properties of the fluid. Examples of suitable additives include biocides, sequestering agents, chelating agents, anti-corrosion agents, marker dyes (e.g., visible, ultraviolet, infrared, fluorescent, etc.) and/or the like, and/or combinations thereof. In an embodiment, the fixer includes an anti-corrosion agent such as, for example, Cobratec® CBT, a carboxybenzotriazole which is commercially available from PMC Specialties Group, Inc., located in Cincinnati, Ohio. The fixer may also include a marker dye such as, for example, Basic Violet 16 (BV 16). In another embodiment, the additive(s) is/are present in the fixer composition in an amount ranging from about 0.01 wt % to about 1 wt %. It is to be understood that the upper limit of the amount of additive present depends, at least in part, on the additive used, the impact on the image, its solubility, the impact on pen function, and/or combinations thereof. In one embodiment, about 0.05 wt % of the additive is present. In still another embodiment, no additive(s) is/are present.

In an embodiment of the fixer that includes the acid, any suitable acid may be selected. A strong acid (i.e., an acid that is fully ionized in water) may be particularly suitable. Non-limiting examples of such acids include methanesulfonic acid, hydrochloric acid, nitric acid, hydrobromic acid, sulfuric acid, perchloric acid, hydroiodic acid, trifluoroacetic acid, and/or combinations thereof. As an example, methanesulfonic acid may be selected because it is monovalent, and its anion has minimal corrosive properties. The acid adjusts the pH and protonates a percentage of the amine-N-oxide, thereby forming a conjugate acid. The amine-N-oxide is a relatively weak base, which in the presence of the acid, results in a mixture of a relatively weak conjugate acid and weak base. The buffering stability of this embodiment of the fixer is maximized with substantially equal amounts of the weak acid and the weak base. The acid capacity of this embodiment of the fixer is enhanced when the pH is slightly below the pKa of the amine-N-oxide conjugate acid.

As such, it may be desirable to adjust the pH of the fixer so that it is within about 1 pH unit of the pKa of the conjugate acid of the selected weak base (amine-N-oxide).

In a non-limiting example, the tri-alkyl-substituted amine-N-oxide is 4-methylmorpholine-N-oxide, and the acid is methanesulfonic acid. The pKa of the resulting conjugate acid of 4-methylmorpholine-N-oxide ranges from 4 to 5. As a non-limiting example, the pKa of the resulting conjugate acid of 4-methylmorpholine-N-oxide is 4.2. As such, these embodiments of the fixer are particularly suitable buffers at pHs below 1.5 units above the pKa of the conjugate acid (i.e., for a pKa=4.2, the pH is below 5.7).

In an embodiment of the fixer that includes the cationic polyelectrolyte(s), any suitable cationic polyelectrolyte(s) may be selected. Non-limiting examples of such cationic polyelectrolytes include a quaternized polyamine, a water soluble dicyandiamide polycation, diallyldimethyl ammonium chloride polymers, quaternized dimethylaminoethyl (meth)acrylate polymers, quaternized vinylimidazol polymers, modified cationic vinylalcohol polymers, alkylguanidine polymers, polyethyleneimine, and/or combinations thereof. It is to be understood that one or more polyelectrolytes may be used, and that any desirable combination of the polyelectrolytes may be used. Generally, the amount of polyelectrolytes is selected to optimize pen reliability and dye fixing. As a non-limiting example, when two different cationic polyelectrolytes are included in the fixer, the ratio of one polyelectrolyte to the other ranges from about 0.1:3.9 to about 3.9:0.1.

One or more ions of the cationic polyelectrolytes may be ion-exchanged for a nitrate, acetate or mesylate ion. In a non-limiting example, the chloride ion of a commercially available water-soluble polyvalent cationic polymer (such as dicyandiamide polycation) is ion-exchanged for a mesylate ion. In another embodiment, the cationic polyelectrolytes may be synthesized with the mesylate ion.

As a non-limiting example, the fixer includes a combination of a quaternized polyamine (a suitable non-limiting example of which includes Floquat® FL 2350, which is commercially available from SNF, Inc., located in Riceboro, Ga.) and a dicyandiamide polycation (a suitable non-limiting example of which includes DEC 53, which is also commercially available from SNF, Inc.). Both the quaternized polyamine and the dicyandiamide polycation are coupled with a chloride anion, which is ion-exchanged or otherwise substituted with a mesylate anion. In a non-limiting example, the cationic polyelectrolytes are present in the fixing fluid in a weight ratio ranging from about 1.9:1.9 to about 1.8:2 of quaternized polyamine:water soluble dicyandiamide polycation.

As indicated hereinabove, embodiments of the fixer having the cationic polyelectrolyte(s) therein are particularly suitable for use with inks containing dye(s).

Other embodiments of the fixer include combinations of the acid and the cationic polyelectrolyte(s). Such embodiments of the fixer are particularly suitable for use with inks including pigment and dye combinations.

As disclosed herein, the inkjet ink set includes an embodiment of the previously described fixer and an ink having a colorant dispersed or dissolved in an ink vehicle. It is to be understood that any number of colored inks may be included in the ink set with the fixer. Furthermore, any desirable combination of colored inks may be used. For example, each of the colored inks may be a different color, or two or more of the inks may be different shades of the same color (i.e., light magenta and dark magenta inks). In an embodiment, the inkjet ink set includes four different colored inks; a black ink, a yellow ink, a cyan ink, and a magenta ink. In another embodiment, the inkjet ink set includes any desirable number of inks selected from black ink, yellow ink, cyan ink, magenta ink, orange ink, red ink, green ink, and/or combinations thereof.

It is to be understood that any suitable inkjet ink may be used with the fixer embodiments disclosed herein. In particular, pigment based inks may be particularly suitable for use with the embodiment of the fixer including amine-N-oxide and strong acid, and dye based inks may be particularly suitable for use with the embodiment of the fixer including amine-N-oxide and cationic polyelectrolytes. Pigment and dye based inks may be particularly suitable for use with the embodiment of the fixer including amine-N-oxide, acid and cationic polyelectrolytes. Described hereinbelow are some non-limiting examples of suitable inkjet inks that may be used in combination with embodiments of the fixer.

The colorant for each ink is selected from a pigment, a dye, or combinations thereof. In an embodiment, the colorant for the cyan and/or magenta inks is a combination of a pigment and a dye.

In one example, the pigments are not self-dispersing, and a dispersing aid may be added to the vehicle. In another example, the pigment portion of the colorant may be self-dispersable and modified to include at least one polymer chemically attached thereto.

The modified pigments may be formed by combining the pigment with polymers containing carboxylic groups, non-limiting examples of which include styrene-acrylic polymers, polyacrylic acid polymers, polymethacrylic acid polymers, and styrene maleic anhydride polymers. Suitable styrene-acrylic acid polymers include, but are not limited to, polystyrene-acrylic acid, polystyrene-methacrylic acid, and/or the like, and/or combinations thereof. It is to be understood that other self-dispersing pigments may be used. Non-limiting examples of suitable polymer-modified pigments (including coupling agents) are provided in U.S. Pat. No. 6,699,319, which is incorporated herein by reference in its entirety.

The pigments and/or dyes for the cyan and magenta colorants may be selected from several commercially available pigments and/or dyes. Non-limiting examples of suitable pigments for the cyan colorant include pigment blue 1, pigment blue 2, pigment blue 3, pigment blue 15:3, pigment blue 15:4, pigment blue 16, pigment blue 22, vat blue 4, vat blue 6, and/or the like, and/or combinations thereof. Examples of suitable dyes for the cyan colorant include, but are not limited to triphenylmethane dyes, such as, for example, acid blue 9 and acid blue 7, and phthalocyanine dyes, such as, for example, direct blue 199. Non-limiting examples of suitable pigments for the magenta colorant include pigment red 5, pigment red 7, pigment red 12, pigment red 48, pigment red 48, pigment red 57, pigment red 112, pigment red 122, and/or the like, and/or combinations thereof. Examples of suitable dyes for the magenta colorant include, but are not limited to, xanthene dyes, such as, for example, acid red 52, acid red 289, γ-acid dyes, H-acid dyes, and/or combinations thereof.

In another embodiment, the colorant for the black and/or the yellow ink is a dye or a pigment. Examples of suitable dyes for the black colorant include, but are not limited to water soluble metal complex azo dyes such as Reactive Black 31 and Reactive Black 8, water soluble polyazo dyes such as Direct Black 19, Direct Black 195, and Direct Black 168, and water soluble sulfur dyes such as Solubilized Sulfur Black 1. Materials such as carbon black or derivatives of carbon black are non-limiting examples of suitable pigments for the black ink.

Examples of suitable dyes for the yellow colorant include, but are not limited to AY-17, AY-23, DY-132, Y-104, and/or combinations thereof. PY-74 is a non-limiting example of a suitable pigment for the yellow ink.

It is to be understood that one or more of the inks in the ink set may include substantially the same colorant and/or substantially the same ink vehicle formulation. In an example, the ink set includes the yellow ink, the cyan ink, and the magenta ink; each of which has substantially the same ink vehicle formulation.

Each colorant or combination of colorants is/are combined with respective individual ink vehicles to form the one or more inks of the ink set. As defined herein, an "ink vehicle" refers to the vehicle in which the colorant(s) is/are placed to form the ink. A wide variety of ink vehicles may be used with the inks, ink sets, and methods according to embodiments disclosed herein. Non-limiting examples of suitable components for the ink vehicle(s) include water soluble polymers, anionic polymers, surfactants, solvents, co-solvents, buffers, biocides, sequestering agents, viscosity modifiers, surface-active agents, chelating agents, resins, and/or water, and/or combinations thereof.

Suitable solvents for the ink vehicle include, but are not limited to glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, Dantocol® DHE (Lonza, Inc., Fairlawn N.J.), and/or combinations thereof. Inks used in combination with the fixer having at least the amine-N-oxide and the acid therein may include one or more of the following solvents: ethylene glycol, diethylene glycol, triethylene glycol, or 1-propoxy-2-propanol. In a non-limiting example, the solvent(s) are present in the ink vehicle in an amount ranging from about 1 wt % to about 25 wt %. In another non-limiting example, the solvent(s) are present in the ink vehicle in an amount ranging from about 5 wt % to about 20 wt %. In still another non-limiting example, the solvent(s) are present in the ink vehicle in an amount ranging from about 8 wt % to about 18 wt %. The amount and type of solvent used depends, at least in part, on the desirable properties of the ink. As such, the amounts may vary as desired.

In an embodiment, a single solvent is used in the ink vehicle of one or more of the colored inks. Examples of such solvents include, but are not limited to tripropylene glycol, tetraethylene glycol, or 1-(2-hydroxyethyl)-2-imidazolidinone. In another embodiment, the inks include a mixture of two or more of the previously listed solvents. As non-limiting examples, the cyan and yellow inks include a mixture of tripropylene glycol and tetraethylene glycol; the magenta ink includes a mixture of tripropylene glycol and 1-(2-hydroxyethyl)-2-imidazolidinone; and the black ink includes a mixture of Dantocol® DHE and 1-(2-hydroxyethyl)-2-pyrrolidone. In an embodiment, the total weight percent of the solvent mixture ranges from about 7 wt % to about 22 wt %. In another embodiment, the total weight percent of the solvent mixture ranges from about 12 wt % to about 17 wt %. In still another embodiment, the total weight percent of the solvent mixtures ranges from about 6 wt % to about 15 wt %.

The surfactants for the ink vehicle are generally nonionic or anionic. Suitable nonionic surfactants include, but are not limited to ethoxylated alcohols, fluorinated surfactants, 2-diglycol surfactants, and/or combinations thereof. Specific examples of nonionic surfactants include surfactants from the Surfynol® series (e.g., Surfynol® CT211, Surfynol® SEF), manufactured by Air Products and Chemicals, Inc., in addition to the surfactants (e.g., Tergitol®) provided hereinabove for the aqueous vehicle of the fixer.

Non-limiting examples of suitable anionic surfactants for the ink vehicle include those anionic surfactants of the Dowfax® family (e.g., Dowfax® 8390), manufactured by Dow Chemical Company, located in Midland, Mich., or anionic Zonyl® surfactants (e.g., Zonyl® FSA), manufactured by E.I. duPont de Nemours and Company; phosphate ester surfactants including the surfactants of the Emphos® series and the DeDophoS® series, both manufactured by Witco Corp., Middlebury, Conn., the surfactants of the Hostaphat® series, manufactured by Clariant GmbH, Frankfurt, Germany, the surfactants of the ESI-Terge® series, manufactured by Cook Composites and Polymers Co., Kansas City, Mo., the surfactants of the Emulgen® series, manufactured by Kao Specialties Americas LLC, High Point, Nalco, the surfactants of the Crodafos® series, manufactured by Croda Inc., Edison, N.J., the surfactants of the Dephotrope® series and of the DePHOS® series, both manufactured by DeForest Enterprises Inc., Boca Raton, Fla.; alkyl sulfates (e.g., lauryl sulfate), alkyl ether sulfates (e.g., sodium laureth sulfate); N-lauroyl sarcosinate; dodecylbenzene sulfonate; and/or combinations thereof. In an embodiment, the ink vehicle includes one or more surfactants present in an amount up to about 8 wt %, with other non-limiting examples including from about 0.1 wt % to about 6 wt % and from about 1.2 wt % to about 2 wt. %.

The polymers for the ink vehicle are generally water-soluble, and may be selected from those of the salts of styrene-(meth)acrylic acid copolymers, polystyrene-acrylic polymers, polyurethanes, and/or other water-soluble polymeric binders, and/or combinations thereof. Non-limiting examples of suitable polyurethanes include those that are commercially available from Dainippon Ink & Chem, Inc. (DIC), located in Osaka, Japan.

As a non-limiting example, one class of polymeric binders suitable for use in the ink includes salts of styrene-(meth) acrylic acid copolymers. A salt of a styrene-(meth)acrylic acid copolymer includes at least a styrene skeleton and a skeleton of the salt of the styrene-(meth)acrylic acid copolymer in its structure. It may also contain a skeleton derived from a monomer having another unsaturated group, such as a (meth)acrylate skeleton, in its structure. Suitable non-limiting examples of styrene-(meth)acrylic acid copolymers are commercially available and may be selected from the Joncryl® series (e.g., Joncryl® 586 and 683), manufactured by BASF, Corp. located in Florham Park, N.J.; SMA-1000Na and SMA-1440K, manufactured by Sartomer, located in Exton, Pa.; Disperbyk 190, manufactured by BYK Chemicals, located in Wallingford, Conn.; polystyrene-acrylic polymers manufactured by Gifu Shellac, located in Japan; or combinations thereof.

In an embodiment, the ink vehicle includes at least one polymer present in an amount ranging from about 0.01 wt % to about 4 wt %. In another embodiment, the ink vehicle includes at least one polymer present in an amount ranging from about 0.1 wt % to about 1.5 wt %.

Additives may also be incorporated into embodiment(s) of the ink vehicle for the inks. As a non-limiting example, bactericides, such as Proxel® GXL, may be added to the ink to protect the ink from bacterial growth. Other suitable additives include, but are not limited to, buffers, biocides, sequestering agents, chelating agents, or the like, or combinations thereof. In an embodiment, the ink vehicle includes one or more additives present in an amount ranging from about 0.1 wt % to about 0.5 wt %. In another embodiment, no additives are present.

In an embodiment, the amount of colorant present in the respective ink compositions ranges from about 3 wt % to about 4.5 wt %. It is to be understood however, that the colorant loading may be more or less, as desired.

The inks are generally prepared by combining the solvent(s), the surfactant(s), any additive(s), and water, and adjusting the pH to a basic pH. In an embodiment, the pH of the colored ink ranges from about 8 to about 11. In another embodiment, the pH of the colored ink ranges from about 8.5 to about 9.5. The colorant(s) and the polymer(s) are then added to form the ink compositions.

The fixer and at least one ink are incorporated into an ink set. In an embodiment, the ink set includes an embodiment of the fixer/fixing fluid, and any number of inks, all deposited into individual pens. Non-limiting examples of suitable pen configurations for the ink set include single pens, dual chamber pens, tri-chamber pens, brick heads, and/or the like, and/or combinations thereof.

In an embodiment of a method of using the embodiment(s) of the fixer and ink compositions, the ink composition is established on at least a portion of the substrate to form an image. The fixer is established under the ink composition, over the ink composition, or combinations thereof. The amount of fixer and/or ink composition used depends, at least in part, on the desirable image to be formed. A non-limiting example of a suitable inkjet printing technique includes drop-on-demand inkjet printing, which encompasses thermal and piezoelectric inkjet printing. Suitable printers include portable drop-on-demand inkjet printers (e.g., handheld printers, arm mountable printers, wrist mountable printers, etc.), desktop drop-on-demand inkjet printers, pagewide array drop-on-demand printers/copiers, high-speed production printers, or combinations thereof.

To further illustrate embodiment(s) of the present disclosure, an example is given herein. It is to be understood that this example is provided for illustrative purposes and is not to be construed as limiting the scope of the disclosed embodiment(s).

EXAMPLE

Table 1 illustrates the black ink composition used in this example.

TABLE 1

Black Ink Composition

| Component | Amount |
|---|---|
| Mixture of low molecular weight heterocyclic water miscible solvents | 9.5 wt % |
| Non-ionic surfactant | 0.85 wt % |
| Anionic surfactant | 0.6 wt % |
| Fluorinated surfactant | 0.05 wt % |
| Biocide | 0.1 wt % |
| Polyurethane binder | 0.7% |
| Black pigment | 3% |
| De-ionized water | Balance |

Different fixer formulations were tested in combination with the black ink. Each of the fixer formulations had a different amount of 4-methylmorpholine-N-oxide (MMNO). The basic composition of the fixer is shown in Table 2, which indicates that amounts of both MMNO and methanesulfonic acid (used to adjust the pH of MMNO to about 4) varied per formulation.

TABLE 2

Fixer Composition

| Component | Amount |
|---|---|
| 1,1' Dihydroxymethylbutanol | 16 wt % |
| Fluorinated surfactant | 0.1 wt % |
| Nonionic surfactant | 0.4 wt % |
| 4-methylmorpholine-N-oxide (MMNO) | Ranged from 0 wt % to 14 wt % |
| Methanesulfonic acid | Ranged from 0 wt % to 9 wt % |
| De-ionized water | Balance |

The ink and fixer were established on Hewlett Packard Multipurpose plain paper using Hewlett Packard 88-type printheads. 18 ng/300 dpi of the respective fixer formulations were printed first, and 48 ng/300 dpi of black ink was printed on top of each of the printed fixers.

FIG. 1 illustrates that the optical density increased as the MMNO content increased. The curve shown in FIG. 1 is the result of a statistically designed experiment using D-Optimal Design of Experiments with 1 categorical and 2 numerical factors. The data points at 0 wt % and 14 wt % MMNO are the actual black optical density data points that were measured for the inks containing 0 wt % and 14 wt % MMNO, respectively. The data points at 2, 4, 6, 8, 10 and 12 wt % in FIG. 1 represent the statistical response surface constructed by the software between the low (0 wt %) and high (14 wt %) points. The six middle data points are results calculated using additional related data collected during the same experiment. The statistical confidence in these six middle data points is very high (the R^2 value for the fit is about 0.98).

It was observed that in the absence of MMNO, the pigment did not precipitate on the paper surface, but rather penetrated into the media. This resulted in relatively low optical density and relatively poor image quality (i.e., the black ink looked grey). As MMNO, in combination with strong acid, was added to the fixer, the pigments precipitated on the paper surface and the optical density increased. This also resulted in improved image quality.

While several embodiments have been described in detail, it will be apparent to those skilled in the art that the disclosed embodiments may be modified. Therefore, the foregoing description is to be considered exemplary rather than limiting.

What is claimed is:

1. A fixer fluid, comprising:
    an aqueous vehicle;
    a tri-alkyl-substituted amine-N-oxide; and
    a cationic polyelectrolyte;
    wherein the cationic polyelectrolyte includes a mesylate counter ion.

2. The fixer fluid as defined in claim 1 wherein the tri-alkyl-substituted amine-N-oxide is selected from the group consisting of 4-methylmorpholine-N-oxide, 4-ethylmorpholine-N-oxide, N,N-dimethyl-N-butylamine-N-oxide, N,N,N-trimethylamine-N-oxide, and combinations thereof.

3. The fixer fluid as defined in claim 1 wherein the fixer fluid includes a combination of the cationic polyelectrolyte and an acid.

4. The fixer fluid as defined in claim 1 wherein the cationic polyelectrolyte is selected from the group consisting of a quaternized polyamine, a water soluble dicyandiamide polycation, diallyldimethyl ammonium chloride polymers, quaternized dimethylaminoethyl(meth)acrylate polymers, quaternized vinylimidazol polymers, modified cationic vinylalcohol polymers, alkylguanidine polymers, polyethyleneimine, and combinations thereof.

5. The fixer fluid as defined in claim 3 wherein the acid is selected from the group consisting of methanesulfonic acid, hydrochloric acid, nitric acid, hydrobromic acid, sulfuric acid, perchloric acid, hydroiodic acid, trifluoroacetic acid, and combinations thereof.

6. The fixer fluid as defined in claim 3 wherein the acid is methanesulfonic acid.

7. The fixer fluid as defined in claim 1 wherein the tri-alkyl-substituted amine-N-oxide is present in an amount ranging from about 7 wt % to about 45 wt %, and wherein the aqueous vehicle includes:
    a co-solvent present in an amount up to about 25 wt %;
    a cationic or nonionic surfactant present in an amount ranging from about 0.2 wt % to about 1.5 wt %; and
    water.

8. The fixer fluid as defined in claim 7 wherein the nonionic surfactant is a fluorinated surfactant.

9. The fixer fluid as defined in claim 7, further comprising at least one additive present in an amount up to about 1 wt %, wherein the at least one additive is selected from an anti-corrosion agent, a marker dye, and combinations thereof.

10. The fixer fluid as defined in claim 3 wherein a pH of the fixer fluid is at or below about 1.5 units above a pKa of a conjugate acid of the tri-alkyl-substituted amine-N-oxide.

11. An inkjet ink set, comprising:
    an ink including a colorant dispersed in a basic ink vehicle; and
    a fixer fluid including:
        an aqueous vehicle;
        a tri-alkyl-substituted amine-N-oxide; and
        a cationic polyelectrolyte;
    wherein the cationic polyelectrolyte includes a mesylate counter ion.

12. The inkjet ink set as defined in claim 11 wherein the colorant is a black colorant, and wherein the ink vehicle includes:
    at least one solvent present in an amount ranging from about 1 wt % to about 25 wt %;
    at least one surfactant present in an amount ranging from about 0.1 wt % to about 8 wt %;
    at least one polymer present in an amount ranging from about 0.1 wt % to about 4 wt %, wherein the at least one polymer includes polyurethane;

at least one additive present in an amount up to about 0.2 wt %; and water.

13. The inkjet ink set as defined in claim 12 wherein the at least one solvent is selected from the group consisting of glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, triethylene glycol, di-(2-hydroxyethyl)-5,5-dimethylhydantoin, and combinations thereof.

14. The inkjet ink set as defined in claim 11 wherein the colorant is selected from a yellow colorant, a magenta colorant and a cyan colorant, and wherein the ink vehicle includes:
   at least one solvent present in an amount ranging from about 3 wt % to about 25 wt %;
   at least one surfactant present in an amount ranging from about 0.1 wt % to about 8 wt %;
   at least one polymer present in an amount ranging from about 0.1 wt % to about 4 wt %;
   at least one additive present in an amount up to about 0.2 wt %; and
   water.

15. The inkjet ink set as defined in claim 14 wherein at least one of the cyan colorant or the magenta colorant includes a combination of a pigment and a dye, and wherein the yellow colorant includes a dye or a pigment.

16. The inkjet ink set as defined in claim 15 wherein the pigment is a self-dispersible pigment including at least one polymer chemically attached thereto.

17. The inkjet ink set as defined in claim 14 wherein the at least one solvent is selected from the group consisting of glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, triethylene glycol, di-(2-hydroxyethyl)-5,5-dimethylhydantoin, and combinations thereof.

18. The inkjet ink set as defined in claim 11 wherein the tri-alkyl-substituted amine-N-oxide is selected from 4-methylmorpholine-N-oxide, 4-ethylmorpholine-N-oxide, N,N-dimethyl-N-butylamine-N-oxide, N,N,N-trimethylamine-N-oxide, and combinations thereof.

19. The inkjet ink set as defined in claim 11 wherein the ink is selected from a black ink, a yellow ink, a cyan ink, a magenta ink, an orange ink, a red ink, and a green ink, and wherein the ink set further comprises at least one other ink selected from a black ink, a yellow ink, a cyan ink, a magenta ink, an orange ink, a red ink, and a green ink.

20. A method of forming a fixer fluid, comprising:
   providing an aqueous vehicle having a tri-alkyl-substituted amine-N-oxide therein; and
   introducing a cationic polyelectrolyte to the aqueous vehicle;
   wherein the cationic polyelectrolyte includes a mesylate counter ion.

21. The method as defined in claim 20, further comprising:
   introducing an acid to the aqueous vehicle; and
   using the acid to adjust a pH of the aqueous vehicle so that the pH at or below about 1.5 units above a pKa of a conjugate acid of the tri-alkyl-substituted amine-N-oxide.

22. The method as defined in claim 21 wherein the acid is selected from the group consisting of methanesulfonic acid, hydrochloric acid, nitric acid, hydrobromic acid, sulfuric acid, perchloric acid, hydroiodic acid, trifluoroacetic acid, and combinations thereof.

23. The method as defined in claim 20 wherein the tri-alkyl-substituted amine-N-oxide is selected from the group consisting of 4-methylmorpholine-N-oxide, 4-ethylmorpholine-N-oxide, N,N-dimethyl-N-butylamine-N-oxide, N,N,N-trimethylamine-N-oxide, and combinations thereof.

24. A method of using the fixer fluid as defined in claim 1, the method comprising incorporating the fixer fluid into an ink set including at least one ink.

* * * * *